(12) United States Patent
Kasch et al.

(10) Patent No.: US 8,142,682 B2
(45) Date of Patent: Mar. 27, 2012

(54) CHOLESTERIC MULTI-LAYERS

(75) Inventors: Michael Kasch, Veit an der Glan (AT); Adolf Gurtner, Wildenau (AT)

(73) Assignee: Sicpa Holding SA, Prilly (CH)

( * ) Notice: Subject to any disclaimer, the term of this patent is extended or adjusted under 35 U.S.C. 154(b) by 506 days.

(21) Appl. No.: 12/305,712

(22) PCT Filed: Jun. 27, 2007

(86) PCT No.: PCT/EP2007/056394
§ 371 (c)(1),
(2), (4) Date: Dec. 19, 2008

(87) PCT Pub. No.: WO2008/000755
PCT Pub. Date: Jan. 3, 2008

(65) Prior Publication Data
US 2010/0178508 A1 Jul. 15, 2010

(30) Foreign Application Priority Data
Jun. 27, 2006 (EP) .................................. 06116141

(51) Int. Cl.
*C09K 19/38* (2006.01)
*C09K 19/52* (2006.01)
*B32B 27/08* (2006.01)

(52) U.S. Cl. ................ 252/299.01; 252/299.5; 428/402; 428/515

(58) Field of Classification Search ............... 252/299.7, 252/299.5, 299.01; 428/515, 402
See application file for complete search history.

(56) References Cited

U.S. PATENT DOCUMENTS

| | | | |
|---|---|---|---|
| 5,211,877 A | 5/1993 | Andrejewski et al. | |
| 5,362,315 A | 11/1994 | Muller-Rees et al. | |
| 6,410,130 B1 | 6/2002 | Schuhmacher et al. | |
| 6,421,107 B1 | 7/2002 | Greenfield et al. | |
| 6,423,246 B1 | 7/2002 | Kasch et al. | |
| 6,531,221 B1 | 3/2003 | Schuhmacher et al. | |
| 6,582,781 B1 | 6/2003 | Schuhmacher et al. | |
| 6,656,543 B2 | 12/2003 | Schuhmacher et al. | |
| 7,794,620 B2 * | 9/2010 | Kasch et al. | 252/299.01 |
| 2005/0266158 A1 | 12/2005 | Pokorny et al. | |

FOREIGN PATENT DOCUMENTS

EP 1046692 10/2000

(Continued)

OTHER PUBLICATIONS

Eberle et al., "Inverse Angle Dependence of the Reflection of Colours of Cholesteric Polymeric Liquid Crystals Mixed with Pigments", Liquid Crystals, Basingstoke, Hampshire, GB, vol. 5, No. 3, 1989, pp. 907-916, XP009020190.

Broer et al., "In-situ photopolymerization of oriented liquid-crystalline acrylates, 5a): Influence of the alkaline spacer on the properties of the mesogenic monomers and the formation and properties of oriented polymer networks"; Makromol. Chem. 192; pp. 59-74, Huthig & Wepf Verlag. Basel 1991.

(Continued)

*Primary Examiner* — Shean Wu
(74) *Attorney, Agent, or Firm* — Greenblum & Bernstein, PLC

(57) ABSTRACT

The invention discloses a multilayer of cholesteric liquid crystal polymer (CLCP), wherein at least two layers of CLCP differing in at least one optical property are arranged on top of each other, characterized in that said at least two layers are chemically inter-layer cross-linked through the polymer network, such as to form a mechanically unique solid body which can be comminuted to pigment without deterioration of its inner structure, and which has an abrupt change of cholesteric liquid crystal pitch at the interface between said at least two layers of cholesteric liquid crystal polymer. Corresponding pigments, coating compositions and there use in security and decorative printing and coating applications are disclosed as well.

24 Claims, 11 Drawing Sheets

FOREIGN PATENT DOCUMENTS

| | | |
|---|---|---|
| EP | 1149823 | 10/2001 |
| EP | 1017755 | 1/2003 |
| EP | 1295929 | 3/2003 |
| WO | 94/22976 | 10/1994 |
| WO | 95/08786 | 3/1995 |
| WO | 00/49105 | 8/2000 |

OTHER PUBLICATIONS

De Visser et al., "Thermal Bulk Polymerization of Cholesteryl Acrylate", Journal of Polymer Science, Part A-1, vol. 9, pp. 1893-1899, John Wiley & Sons, Inc., 1971.

* cited by examiner

CHOLESTERIC MULTI-LAYERS

FIELD OF INVENTION

The present invention is in the field of special pigments for coating compositions, in particular for security document printing inks. It addresses a new type of cholesteric liquid crystal polymer layers and the thereof resulting pigments, which allow for a higher degree of variation of the spectral reflection characteristics, noteworthy the reflection colour and the angle-dependent colour variation.

BACKGROUND OF THE ART

Films and pigments made from cholesteric liquid crystal polymers (CLCP) are known in the art. Reference is made to U.S. Pat. No. 5,211,877 (Andrejewski et al.); U.S. Pat. No. 5,362,315 (Willer-Rees et al.); and U.S. Pat. No. 6,423,246 (Kasch et al.), which disclose compositions and technology for producing such materials.

Cholesteric liquid crystal polymers show a molecular order in the form of helically arranged molecular stacks. This order is at the origin of a periodic refractive index modulation throughout the liquid crystal material, which in turn results in a selective transmission/reflection of determined wavelengths of light (interference filter effect). The particular situation of the helical molecular arrangement in CLCPs causes the reflected light to be circularly polarized, left-handed or right-handed, depending on the sense of rotation of the molecular helices.

The range of wavelengths reflected by a CLCP is determined by the geometry of its periodic refractive index modulation, i.e. the pitch of the molecular helices, as known to the skilled man. For a given cholesteric liquid crystal precursor material, said pitch depends on a series of selectable factors, among them the temperature, as well as the quantitative presence of solvents and determined chirality-inducing additives; the wavelength of maximum reflection can thus be determined by the chosen manufacturing process. The pitch of the material can finally be frozen by a cross-linking (polymerization) reaction, such that the colour of the resulting cholesteric liquid crystal polymer (CLCP) is no longer depending on external factors.

To achieve this, the monomeric or oligomeric cholesteric liquid crystal material is made to contain reactive groups, such as acrylate and/or methacrylate residues, which can undergo a crosslinking reaction under the influence of UV radiation in the presence of a suitable photoinitiator. Thus, the freezing of the pitch of the suitable oriented CLCP precursor can be simply performed by an exposure to UV-light (UV-curing).

In addition to a determined reflection colour, the cholesteric liquid crystal polymer (CLCP) shows also a more or less pronounced viewing-angle dependent colour variation ('colour shift'). Films and pigments made of CLCP are for this reason used as security elements on value and identity documents, because the said colour-shifting effect cannot be reproduced by photocopying machines. The reflection band of CLCP materials is relatively narrow and its angle-dependency is given by $$\lambda_{refl.} = n*p*\cos(\alpha)$$

wherein $\lambda_{refl.}$ is the wavelength of maximum reflection; n is the mean refractive index of the material (of the order of 1.5); p is the pitch of the molecular helices; and $\alpha$ is the viewing angle (Eberle et al., Liq. Cryst. 1989, Vol. 5, No 3, 907-916).

It is inferred from this formula that increasing the viewing angle causes the reflection wavelength to shift towards shorter wavelengths.

A number of different reflection colours can be realized with a same given CLCP precursor material through appropriately choosing the manufacturing conditions. Further to this, the handiness (left- or right-handed) of the reflection can be chosen as well through the appropriate choice of the chirality inducing additive at the time of manufacturing the material. However, in the field of pigments for security printing, an increase of the number of physically realizable characteristics is perceived as being an advantage, in view of serving a high number of different security document applications.

The number of realizable different optical responses, i.e. 'colours' and 'colour-shifts', can be substantially increased if different CLCP pigment types, having different optical responses, are combined with each other in a same ink. The production of a security element in such case depends on the availability of two or more different pigments, which are mixed together in the appropriate ratios for serving a determined security document application.

It was perceived that the security level of the CLCP material could be further increased, if the different optical responses could be combined into a same physical pigment, because it is much easier to make up an ink comprising a mixture of a few modular pigments having basic optical responses (i.e. to combine letters of an alphabet), than to manufacture a single pigment which combines optical basic responses into a more complex response (i.e. to find a determined word). Whereas the former can essentially be done in any printer's shop, if the basic pigments are available, the latter can only be performed at the pigment manufacturing facility, and enables therefore a perfect control of the pigment supply chain.

Cholesteric polymeric multilayers, composed from laminated monolayers, have been previously described by Dobrusskin et al. in WO 95/08786. This document discloses a coloured material comprising an aligned chiral liquid crystal polymer (CLCP) lamina of a first kind, and an aligned chiral liquid crystal polymer (CLCP) lamina of a second kind, each lamina being reflective for light in a respective wavelength band when viewed at a given angle, and being solid at room temperature.

To prepare the coloured material of WO 95/08786, the CLCP precursor of a first layer L1 is mixed with a photoinitiator and spread over a flexible carrier sheet S at a first temperature T1, allowing the CLCP precursor to align to form a first colour. The CLCP precursor is then crosslinked by exposing the layer to UV-radiation at said first temperature T1. A second layer L2 is prepared in the same way and spread over the first layer L1 at a second temperature T2, allowing the CLCP precursor to align to form a second colour, and the CLCP precursor is crosslinked by exposing the layer to UV-radiation at said second temperature T2. An embodiment with a first layer shifting from infrared to red, and a second layer shifting from blue to ultra-violet, is disclosed, resulting in a device whose colour shifts from blue to red when going from orthogonal to grazing view.

The double-layer material of WO 95/08786 has, however, the important shortcoming that it cannot be milled down to a pigment. The manufacturing of CLCP pigment comprises the detachment of the polymerized cholesteric layer from the carrier sheet, followed by milling it down to pigment size, suitable for use in inks and coating compositions, using methods known to the skilled man. The double-layer material of WO 95/08786 does not withstand the milling process, thereby decomposing (delaminating) into its individual layers upon detaching it from the carrier sheet, or at latest under the influence of the high energy input in the jet mill, rather than behaving as a single, solid layer throughout the whole process. Using the process and materials disclosed in WO 95/08786, it is therefore not possible to prepare pigments having specific optical properties from cholesteric multi-layers.

In US 2005/266158, liquid crystal bodies such as optical films or reflective polarisers are described. Pigments are not contemplated in the said reference. The said optical films are made to contain up to three different optical layers physically generated from a single coating on a substrate, through subjecting the coating to a sequence of solvent-evaporation- and UV-curing steps. Because of the need for solvent evaporation, the process of US 2005/266158 is however not very suited for the industrial production, due to health, safety and environment concerns.

It was the object of the present invention to overcome the shortcomings of the prior art and to provide pigments having specific, hitherto not available optical properties.

SUMMARY OF THE INVENTION

The above object has been solved according to the present invention by a multilayer of cholesteric liquid crystal polymer, wherein at least two layers of cholesteric liquid crystal polymer differing in at least one optical property are arranged on top of each other, characterized in that said at least two layers are chemically inter-layer cross-linked through the polymer network, such as to form a mechanically unique solid body which can be comminuted to pigment without deterioration of its inner structure and which has an abrupt change of cholesteric liquid crystal pitch at the interface between said at least two layers of cholesteric liquid crystal polymer.

According to the present invention, it was found that such a multilayer stack can be comminuted to pigments without any deterioration of its inner structure, thereby enabling the preparation of pigments having advantageous, hitherto not available optical properties.

According to the present invention there are thus provided new cholesteric multilayer materials, as well as pigments produced thereof, said materials being capable of exhibiting advantageous, hitherto not available optical properties, such as high brilliance and viewing-angle dependent colour change (colour-flip effect), as well as particular reflection properties, such as a colour change from a short-wavelength to a long-wavelength colour in going from orthogonal to oblique view, or an extremely long travel in colour space in response to a changing viewing angle. According to the present invention, said optical properties can be tuned very precisely.

According to the present invention, it was found that the above-described CLCP multilayer pigments can be obtained through a particular choice of the process conditions during the manufacturing of a multilayer material, providing resistance to mechanical delamination.

To avoid a mechanical delamination of the composite pigment made up of individual layers, it has been found a mandatory requirement to provide for a sufficient amount of chemical crosslinking between said individual layers (inter-layer crosslinking). The materials of the prior art, e.g. the one manufactured according to WO 95/08786 do not have sufficient inter-layer crosslinking, because the reactive functionalities in each individual layer of said material are completely polymerized out before the next layer is deposited on top of it. Therefore, in the materials of WO 95/08786, the inter-layer adhesion is only provided through mechanical and Van-der-Waals forces, rather than through chemical bonding.

The differing optical property is preferably a wave-length of maximal reflection and/or a circular polarization state. It may, however, also comprise optical absorption or luminescence properties, such as can be obtained through the admixture of dyes, pigments or luminescent compounds to one of the CLCP layers of the multilayer.

Furthermore, the multilayer may contain additives having non-optical properties, such as magnetic particles, radiofrequency resonant particles or forensic markers.

According to a first embodiment of the present invention, the inter-layer crosslinking is achieved through a staggered curing (polymerization), as outlined in the following:

A first layer L1 is applied onto a flexible carrier foil as known to the skilled man, but the applied film is only partially cured. Typically, the layer is sufficiently cured to freeze the pitch of the CLCP material, while still maintaining a fraction of the originally present reactive groups sufficient for subsequent cross-linking with the second layer L2 applied on top thereof. Said partial curing may be achieved through a metered low-dose UV irradiation, and/or, preferably, through the use of a smaller than required amount of photoinitiator in the precursor composition of layer L1.

In a second pass, a second layer L2 is applied on top of layer L1, and the whole assembly is now thoroughly cured. Thorough curing may be achieved by exhaustive UV irradiation, preferably in conjunction with the use of a higher than required amount of photoinitiator in the precursor composition of layer L2.

If required, optional passes, for depositing additional layers of the first, partially cured type coating (L1a, L1b, L1c, . . . ), may be inserted before applying the layer L2.

The product resulting out of this process behaves mechanically as a single solid polymer layer (unique solid body), which optically shows the combined reflection characteristics of all of the individual layers of which it is composed (as will be outlined below in more detail with respect to the preferred embodiment of FIG. 6).

The resulting product is furthermore characterized in that it has an abrupt change of cholesteric liquid crystal pitch at the interface between the individual layers having differing optical properties. This abrupt change is a distinctive feature of the products according to the present invention, and is seen at the evolution of the cholesteric liquid crystal pitch across the multilayer (as will be outlined below in more detail with respect to the preferred embodiment of FIG. 3); the said pitch, which is responsible for the optical interference properties (reflection wavelength) of the cholesteric material, noteworthy changes abruptly at the layer interface of the present products. For example, in the preferred embodiment of FIG. 3, there is a first pitch of about 200 nanometers in the left part of the layer, and a second pitch of about 130 nanometers in the right part of the layer. The change from the said first to the said second pitch takes place within less than one pitch height, so that no intermediate pitch is observed.

Therefore, according to the present invention, the term "abrupt change of cholesteric liquid crystal pitch" is defined as a change of the cholesteric liquid crystal pitch at the interface between the individual optical layers of the body of the present invention, from a first value of cholesteric liquid crystal pitch which is constant throughout a first optical layer at said interface, to a second value of cholesteric liquid crystal pitch which is constant throughout a second optical layer at said interface, said change taking place within less than one pitch height, so that no intermediate pitch is observed.

The constancy of the cholesteric pitch throughout an optical layer can, e.g. be statistically determined from the absence of a slope in the linear regression of the pitch height p against the pitch number n, according to p=a*n+b. If the experimentally determined slope (a) is higher than three times its standard deviation sigma (a), then it is 99.7% sure that it is not zero, i.e. that the pitch is not constant. Otherwise the pitch may be assumed constant.

This abrupt, stepwise change of liquid crystal pitch at the optical layer boundary is a consequence of the particular manufacturing process resulting in the products of the present invention, and is in contrast to the products of US 2005/0266158 A1, which are made to contain up to three different optical layers physically generated from a single coating on a substrate, through subjecting the coating to a sequence of solvent-evaporation- and UV-curing steps. Said process is noteworthy not capable of producing abrupt pitch variations. Rather, a more or less gradual pitch variation across the liquid crystal polymer layer is obtained, which is easily visualized by a scanning electron micrograph.

As a consequence of the manufacturing, the cholesteric texture of the products of the present invention has a constant first pitch value (within statistical fluctuations), corresponding to a first reflection wavelength, throughout the whole thickness of a first optical layer, followed by a constant second pitch value (within statistical fluctuations), corresponding to a second reflection wavelength, throughout the whole thickness of a second optical layer, etc. There are defined, step-type levels of the cholesteric pitch value, and there is no gliding variation as in the products according to US 2005/0266158.

In the present invention, the first polymerization step(s) is (are) conducted so as to leave enough reactive groups, which can undergo crosslinking reactions with the neighbour layers during the following polymerization steps. The result is an entirely crosslinked polymer film, in which there is not present any phase boundary.

In an alternative way to realize the double- or multi-layer structure of the invention, sequential coatings of corresponding cholesteric liquid crystal precursor compositions are applied in a single pass onto a flexible carrier foil. The compositions are applied to the carrier in the molten state via in-line coating stations, and the respectively applied coating is immediately cooled down, in order to freeze the liquid crystal mixture in place and to avoid its mixing with the next coating layer, applied on top of it. The orienting and curing (polymerization) of the whole composite coating is done at once (joint curing) at a final curing station. Individual layer thicknesses are as in the first embodiment and will be described in more de-tail below.

In a variant of the given embodiments of staggered and joint curing, the coating is performed using solutions of the CLCP monomer precursor materials in an organic solvent or solvent mixture (wet coating), whereby the solvent is evaporated (dried) subsequent to each coating operation.

In another variant of the given embodiments, a continuous belt of thermally resistant material (e.g. steel, aluminum, etc.) is used as the carrier for the coating. This enables the processing of CLCP precursors having their liquid crystalline phase at temperatures ranging up to 400° C.

The deposited CLCP precursors in any of the given embodiments can be protected by a cover foil of PET or any other suitable material, in order to exclude air oxygen during the curing step. The cover foil must be sufficiently thin and of appropriate material, such as not to absorb the UV-radiation used for curing.

The curing of the polymer can be performed under inert conditions (i.e. under an inert gas such as nitrogen, carbon dioxide or argon); this is particularly required in the case of electron beam curing, to prevent oxidation reaction's. In the case of inert conditions, a cover foil is no longer needed for the exclusion of oxygen.

Thus, the processes according to the present invention for making the above CLCP multilayer involve a sequential deposition of at least two coating layers of CLCP monomer precursor material comprising cross-linkable groups, on top of each other onto a flexible carrier substrate, followed by thorough curing of the whole assembly, so as to substantially cross-link all of the cross-linkable groups throughout the coating such as to form a mechanically unique solid body which has an abrupt change of cholesteric liquid crystal pitch at the interface between said at least two layers of cholesteric liquid crystal polymer. The alternative processes differ in that according to the first variant each CLCP coating layer, after deposition, is oriented and partially cured so as to leave an amount of cross-linkable groups in the layer which is sufficient for chemical cross-linking with the adjacent coating layer such as to form a mechanically unique solid body and which has an abrupt change of cholesteric liquid crystal pitch at the interface between said at least two layers of cholesteric liquid crystal polymer. On the other hand, according to the second variant, each CLCP coating layer, after deposition, is frozen or evaporation-dried. According to the second variant, orientation of the CLCP coating layers is carried out after deposition of all coating layers by tempering the whole assembly before the step of thoroughly curing the whole assembly.

In addition to the different colours and colour shifts, a variety of other optical characteristics can be produced in the CLCP material of the present invention, which are invisible to the unaided human eye, and which can only be evidenced with the help of an appropriate instrument:

Narrow-band spectral reflection is an intrinsic characteristic of CLCP materials with highly regular pitch, and much effort has been dedicated in the prior art to enlarge the spectral reflection bandwidth of CLCP pigments, in order to obtain more brilliant reflection colours, and thus a more attractive pigment. The bandwidth of spectral reflection of CLCP materials can be enlarged by introducing a random or a progressive pitch variation through appropriate manipulations during the manufacturing process. This has become possible for the first time by the teaching of the present invention.

The process and the materials of the present invention allow for a more accurate production of a determined CLCP's spectral reflection profile, because said profile can now be precisely composed by superposing an appropriate numbers of layers having each its characteristic narrow band reflection profile at a preset wavelength. This noteworthy allows coding a pigment with an invisible, narrow-band spectral feature, which does not show up as a visible appearance, but which can be evidenced with the help of a spectrometer or of a particular optical filter device.

The fact that the reflected light of a CLCP is circularly polarized can be used as a further security element. The sense of this circular polarization is noteworthy determined through the manufacturing process. The circular polarization handiness can be chosen individually for each layer of the multilayer CLCP of the present invention, and this polarization handiness can be evidenced with the help of a corresponding polarization filter. It is thus possible to give any layer of the multilayer CLCP an individual narrow-band reflection colour, and individual polarization handiness.

The multilayer foil according to the invention can be used for many kinds of security and decorative applications. It is preferably used as a laminate for security threads, or in the form of a foil security element, similar to a hologram or a Kinegram®, for protecting banknotes, certificates or other value- or identity documents.

Most preferred, the multilayer foil of the present invention is worked up into a pigment for use in inks and coating compositions, for all kind of security and decorative coating applications, such as security inks for value- and identity documents, inks for artistic and commercial printing applications, paints for decorative coatings, as well as cosmetic articles (nail lacquers, make-up, etc.) of all kind. Further to this, the pigment can be incorporated into the mass of plastic articles of all kind.

DETAILED DESCRIPTION

The multi-layer stack of the present invention is made up from CLCP compositions which are generally known to the skilled man.

The preferred compositions of the CLCP of the present invention comprise (weight percents (wt %) refer to the total solid contents):

20-99.5 wt %, preferably 60-99 wt % of at least one or several three-dimensionally crosslinkable compounds of the mean general formula (1)

$$Y^1\text{-}A^1\text{-}M^1\text{-}A^2\text{-}Y^2 \qquad (1)$$

wherein
$Y^1$, $Y^2$ are equal or different, and represent polymerizable groups such as acrylate, methacrylate, epoxy, isocyanate, hydroxy, vinyl ether, or vinyl residues;
$A^1$, $A^2$ are equal or different residues of the general formula $C_nH_{2n}$, wherein n is en integer between 0 and 20, and wherein one or several methylene groups may be replaced by an oxygen atom; $M^1$ has the general formula $-R^1-X^1-R^2-X^2-R^3-X^3-R^4-$;
wherein
$R^1$ to $R^4$ are equal or different bivalent residues chosen from the group consisting of $-O-$, $-COO-$, $-COHN-$, $-CO-$, $-S-$, $-CH=CH-$, $-N=N-$, $-N=N(O)-$, and a C—C bond; and wherein $R^2-X^2-R^3$ or $R^2-X^2$ or $R^2-X^2-R^3-X^3$ may as well be a C—C bond;
$X^1$ to $X^3$ are equal or different residues chosen from the group consisting of 1,4-phenylene; 1,4-cyclohexylene; heteroarylenes having 6 to 10 atoms in the aryl core and 1 to 3 heteroatoms from the group consisting of O, N and S, and carrying substituents $B^1$, $B^2$ and/or $B^3$; cycloalkylenes having 3 to 10 carbon atoms and carrying substituents $B^1$, $B^2$ and/or $B^3$;
wherein
$B^1$ to $B^3$ are equal or different substituents chosen from the group consisting of hydrogen, $C_1$-$C_{20}$-alkyl, $C_1$-$C_{20}$-alkoxy, $C_1$-$C_{20}$-alkylthio, $C_1$-$C_{20}$-alkylcarbonyl, $C_1$-$C_{20}$-alkoxycarbonyl, $C_1$-$C_{20}$-alkylthiocarbonyl, $-OH$, $-F$, $-Cl$, $-Br$, $-I$, $-CN$, $-NO_2$, Formyl, Acetyl, as well as alkyl-, alkoxy-, or alkylthio-residues with 1 to 20 carbon atoms having a chain interrupted by ether oxygen, thioether sulfur or ester groups;
0.5 to 80 wt %, preferably 3 to 40 wt % of at least one chiral compound of the mean general formula (2)

$$V^1\text{-}A^1\text{-}W^1-Z-W^2\text{-}A^2\text{-}V^2 \qquad (2)$$

wherein
$V^1$, $V^2$ are equal or different and represent a residue of the following: acrylate, methacrylate, epoxy, vinyl ether, vinyl, isocyanate, $C_1$-$C_{20}$-alkoxy, $C_1$-$C_{20}$-alkylthio, $C_1$-$C_{20}$-alkylcarbonyl, $C_1$-$C_{20}$-alkoxycarbonyl, $C_1$-$C_{20}$-alkylthiocarbonyl, $-OH$, $-F$, $-Cl$, $-Br$, $-I$, $-CN$, $-NO_2$, Formyl, Acetyl, as well as alkyl-, alkoxy-, or alkylthio-residues with 1 to 20 carbon atoms having a chain interrupted by ether oxygen, thioether sulfur or ester groups, or a cholesterol residue;
$A^1$, $A^2$ are as indicated above;
$W^1$, $W^2$ have the general formula $-R^1-X^1-R^2-X^2-R^3$
wherein
$R^1$, $R^2$, $R^3$ are as indicated above, and wherein $R^2$ or $R^2-X^2$ or $X^1-R^2-X^2-R^3$ may also be a C—C bond;
$X^1$, $X^2$ are as indicated above;
Z is a divalent chiral residue chosen from the group consisting of dianhydrohexites (as e.g. iso-sorbide or iso-mannide), hexoses, pentoses, binaphthyl derivatives, biphenyl derivatives, derivatives of tartaric acid, and optically active glycols, and a C—C bond in the case where $V^1$ or $V^2$ is a cholesterol residue.

Those compositions are already known and described in the art along with methods for their manufacture, e.g. in EP 1 149 823 or in EP 1 046 692.

According to the present invention, especially preferred liquid crystal (LC) mixtures are based on the following components:
As component A): a nematic principal component hydroguinone-bis-[4-(4-acryloylbutoxy)-benzoate], (obtained according to Broer, D. J., Mol, G. N., Challa, G.; Makromol. Chem. 1991, 192, 59).
As component B): one of the following chiral components:
DiABIm (Di-2,5-[(4'-acryloyloxy)-benzoyl]-isomannid, obtained according to EP 1 149 823, example 13)

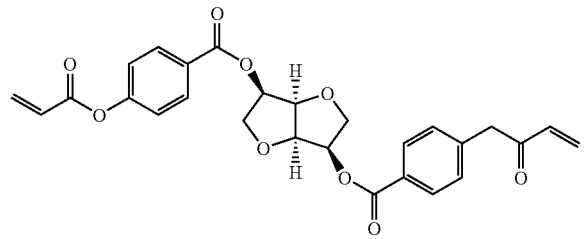

AnABIs (2-[4-(acryloyloxy)-benzoyl]-5-(4-methoxybenzoyl)-isosorbid, obtained according to EP 1 046 692, example 3)

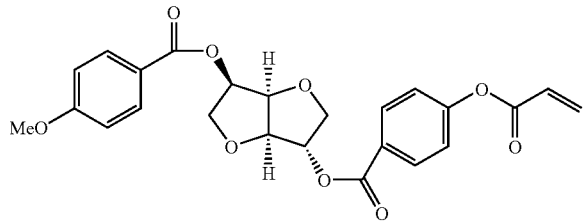

DiABIs (Di-2,5-[4-(acryloloxy)-benzoyl]-isosorbid, obtained according to EP 1 046 692, example 4)

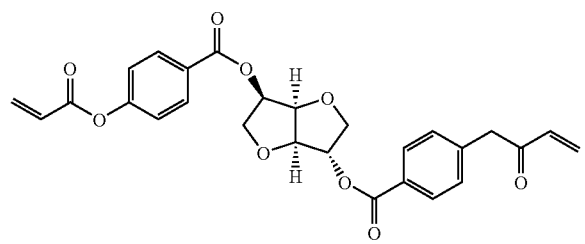

A further preferred component B is methacrylic acid cholesterol ester (obtained according to De Visser et al., J. Polym. Sci., A 1(9), 1893 (1971)).

The sense of circular polarization of the CLCP can be chosen through an appropriate selection of the optically active component B) mentioned above, noteworthy the divalent chiral residue Z which is chosen from the group consisting of dianhydrohexites as e.g. iso-sorbide or iso-mannide), hexoses, pentoses, binaphthyl derivatives, biphenyl derivatives, derivatives of tartaric acid, and optically active glycols, and a C—C bond in the case where $V^1$ or $V^2$ is a cholesterol residue. whereas, e.g. the use of an iso-sorbide derivative yields an exclusively right circular polarized reflection, the use of cholesterol-containing derivatives or iso-mannide leads to an exclusively left circular polarized reflection.

Preferred divalent residues according to the present invention are:

Iso-sorbide:

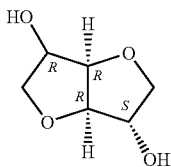

Iso-mannide:

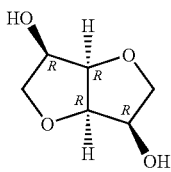

The different realizable compositions are distinguished from each other essentially by a different content in component B), by whose concentration the colour of maximum reflection of the CLCP (i.e. the cholesteric pitch) can be set.

With varying content of component B), the optimal concentration of the photoinitiator required for polymerisation varies as well; the useful concentrations being between 0.00% to 5%, preferably between 0.25% to 2% for the first irradiation step with low UV dose, and between 0.5% and 7%, preferably between 1% and 4% for the second irradiation step with high UV dose.

The concentration ranges of the photoinitiator in the individual layers, as well as the respective doses of the curing agent (UV-radiation, electron beam etc.) may differ to a certain extent from the values herein disclosed; the skilled man will, however, preserve the general principle of the present invention, i.e. to provide for a sufficient amount of unreacted (living) groups in each layer, which can undergo the required inter-layer crosslinking reactions in a subsequent or in the final curing step. From the industrial perspective, the curing by UV-radiation has turned out to be the most practical option.

The process for making a multilayer of cholesteric liquid crystal polymer (CLCP), wherein at least two layers of CLCP, differing in at least one optical property, are arranged on top of each other, comprises the steps of depositing a first coating layer $L_1$ of CLCP monomer precursor material, comprising cross-linkable groups, onto a flexible carrier substrate;
orienting the CLCP coating;
partially curing the oriented layer of step a), so as to leave a significant amount of cross-linkable groups in the layer;
optionally repeating steps a) to c) a chosen number of times, to deposit, orient and partially cure additional layers $L_2$ ... $L_{n-1}$ of CLCP monomer precursor material comprising cross-linkable groups on top of the previous coating;
depositing a last coating layer $L_n$ of CLCP monomer precursor material, comprising cross-linkable groups, on top of the previous coating;
orienting the CLCP coating;
thoroughly curing the whole assembly, so as to essentially cross-link all of the cross-linkable groups throughout the coating;
said cholesteric liquid crystal polymer (CLCP) being characterized in that said at least two layers are chemically cross-linked together through the polymer network, such as to form a mechanically unique solid body which can be comminuted to pigment without deterioration of its inner structure, i.e. without delamination, and which has an abrupt change of cholesteric liquid crystal pitch at the interface between said at least two layers of cholesteric liquid crystal polymer.

An alternative process for making a multilayer of cholesteric liquid crystal polymer (CLCP), wherein at least two layers of CLCP, differing in at least one optical property, are arranged on top of each other, comprises the steps of depositing a first coating layer $L_1$ of CLCP monomer precursor material, comprising cross-linkable groups, onto a flexible carrier substrate;
freezing or evaporation-drying the CLCP coating;
optionally repeating steps a) and b) a chosen number of times, to deposit additional layers $L_2$ ... $L_{n-1}$ of CLCP monomer precursor material comprising cross-linkable groups on top of the previous coating;
depositing a last coating layer $L_n$ of CLCP monomer precursor material, comprising cross-linkable groups, on top of the previous coating;
freezing or drying the CLCP coating;
tempering the whole assembly to orient the deposited CLCP layers thoroughly curing the whole assembly, so as to essentially cross-link all of the cross-linkable groups throughout the coating;
said cholesteric liquid crystal polymer (CLCP) being characterized in that said at least two layers are chemically cross-linked together through the polymer network, such as to form a mechanically unique solid body which can be comminuted to pigment without deterioration of its inner structure, i.e. without delamination, and which has an abrupt change of cholesteric liquid crystal pitch at the interface between said at least two layers of cholesteric liquid crystal polymer.

The coatings can noteworthy herein either be applied from the molten state or from solutions. The curing can be performed by UV-radiation, preferably by UV/A radiation. The dose of UV radiation can be chosen lower for the first layer and higher for the last layer. The amount of photoinitiator can be chosen lower in the first layer and higher in the last layer. The curing can alternatively be performed by electron beam radiation.

In the context of the present invention, the curing of the polymer precursors is preferably performed by UV-radiation, but other curing processes known to the skilled man, such as electron beam curing, ultrasonic curing, etc. might advantageously replace the UV-curing in determined applications. Typical UV doses lie between 0.07 and 0.5 J/cm$^2$ of UV/A (as measured with the radiometer UV-Powerpuk of the company Eltosch, Hamburg, Germany).

According to a first embodiment, and using coating processes known to the skilled man, such as doctor blade coating or roller coating, a flexible carrier, e.g. a PET film or a continuous rubber, plastic, or metal belt, is coated with a first layer of a cholesteric precursor mixture, set up to yield a predetermined first optical property, preferably a reflection colour (spectral reflection maximum). The cholesteric precursor mixture comprises a low amount of photoinitiator (in the range of 0 to 0.5%, preferably in the range of 0 to 0.25%). The subsequent polymerization is carried out using a low dose of UV-radiation (0.03 to 0.3 $J/cm^2$, preferably 0.05 to 0.15 $J/cm^2$), and leads to a polymeric cholesteric film which still contains reactive ('living') groups, but which has stable colour properties (frozen pitch). The mean thickness of the first coating is between 0.5 and 20 micrometer, preferably between 1 and 10 micrometer.

If required, additional intermediate layers of the same type as the first layer, with individually chosen optical properties, may be applied on top of the so obtained and hardened coating; for each intermediate layer, the amount of photoinitiator and the dose of curing UV-radiation are kept low, as indicated for the first layer. The mean thickness of these coatings is between 0.5 and 20 micrometer, preferably between 1 and 10 micrometer.

In a final step, a final layer of cholesteric monomer precursor mixture, set up to yield a predetermined optical property, preferably a reflection colour, whose spectral reflection maximum preferably differs at least by 10 to 80 nm, preferably by 30 to 50 nm in wavelength, from that of the first coating, is applied on top of the already deposited coating(s). The final coating comprises a high amount of photoinitiator (in the range of 0.2 to 3%, preferably 1.75%), and the polymerization is carried out using a comparatively high dose of UV-radiation (0.1 to 0.5 $J/cm^2$). The mean thickness of the last coating is between 0.5 and 20 micrometer, preferably between 1 and 10 micrometer.

The resulting CLCP film is absolutely resistant against delamination and behaves mechanically like a single layer; i.e. in the subsequent detachment and comminuting processes to make the pigment, no separation of the first and the second layer has been observed. This is confirmed by scanning electron micrographs, which do not show any sign of a phase border throughout the thickness of the composite film. The transition from the first to the second layer can only be inferred through the varying, slightly visible pitch of the cholesteric structure.

In a second embodiment, a flexible carrier, e.g. a PET foil (or other suitable carrier), is sequentially coated with different liquid crystal melts, in a way that a first layer of a first melt is applied to the carrier by a first coating station A (which may be a doctor blade, a spray, or a roller coater). The coating is thermally quenched (i.e. rapidly cooled below the solidifying or glass transition point of the liquid crystal phase), and a second coating, set up to exhibit an optical property, preferably a reflection maximum which preferably differs at least by 20 nm in wavelength from the reflection maximum of the first coating, is applied on top of the first coating in the same pass, i.e. without crosslinking the previously applied layer, by a second coating station B (which may be a doctor blade, a spray, or a roller coater). The second coating is thermally quenched as indicated above, and further coatings may be applied, if required, by further coating stations C, D, etc. in the same pass.

The so obtained multiple coating is eventually covered with a second PET foil (or other suitable cover foil) during the same pass, and passes into a tempering zone, with T chosen between 30° C. and 140° C., more preferably between 90° C. and 120° C., depending on the materials used, where it is brought back into the liquid crystalline state, and where all of the previously applied coating layers adopt their specific, pre-programmed pitches. The whole coating is then thoroughly crosslinked (polymerized) at once, by applying an appropriate amount of UV-radiation (or electron beam radiation, or other curing processes known to the skilled man).

Said PET cover foil, analogue to the PET substrate foil, is used to suppress the influence of air oxygen during the oxygen-sensitive UV-polymerization reaction. The cover foil is applied on top of the CLCP-coating, immediately after the application of the last CLCP-layer, and before the UV-polymerization stage.

The aim of using a cover foil is twofold: on one hand the cover foil helps the exclusion of the polymerization-inhibiting oxygen, and on the other hand, it serves to homogenize and orient the coating.

The polymerized CLCP film is detached from the carrier and the cover foil through a peeling, scratching, brushing or other operation, as known to the skilled man. The resulting, coarse CLCP flakes are worked up into pigment using known comminuting operations, such as milling with hammer-, impact-, ball-, or jet-mills, and classified by known separation methods such as triage and sieving, in order to obtain a pigment with specified particle size, having a d50-value in an application-specified range between 5 and 5000 micrometer.

In a variant of this embodiment, solutions of CLCP monomer precursor materials, set up to yield different optical properties such as reflection wavelengths, are coated onto a flexible PET carrier foil (or other suitable carrier), using coating processes known to the skilled man (such as roller coating, doctor-blade coating, curtain-coating, etc.), and the solvent is evaporated after each coating step. The eventually resulting 'sandwich' is covered with a second PET foil (or other suitable cover foil) and is brought back into the liquid crystalline state in a tempering zone where all of the previously applied coating layers adopt their specific, pre-programmed pitches. The whole coating is then thoroughly crosslinked (polymerized) at once by applying an appropriate amount of UV-radiation (or electron beam radiation, as well as other curing processes known to the skilled man).

In still another embodiment, a continuous belt of thermally resistant material (e.g. steel, aluminium, etc.) is multiply coated with melts or solutions of CLCP precursors, which are set up to yield optically different properties, such as reflection wavelengths, polarization, etc. The coatings are processed as indicated above.

Using a thermally resistant carrier belt allows to process liquid crystal polymer precursors having their liquid crystalline range at temperatures going up to 400° C. Again, the crosslinking reaction is performed according to methods known to the skilled man, such as UV-radiation or electron beam curing. At higher temperature, inert conditions (exclusion of oxygen) must be chosen, to prevent oxidative deterioration of the reactive functionalities or of the product. Inert gases such as nitrogen, carbon dioxide or argon are used to bring down the oxygen concentration into a range between 5 ppm to 1%, preferably into a range between 10 to 100 ppm.

When using inert conditions in the curing step, a cover foil (second PET foil) is no longer necessary for the exclusion of oxygen, even in the case of oxygen sensitive materials.

In the case of a carrier belt, the detaching of the CLCP layer from the substrate can also be performed using high-pressure air jets, solid $CO_2$ jets, brushing processes, etc.

The CLCP multilayer of the present invention is most preferably worked up into a pigment using a process according to the present invention. To this aim, the multilayer is detached from the carrier with the help of appropriate equipment, such as a peeling unit or a peeling knife, resulting in coarse CLCP flakes. These flakes are further comminuted CLCP pigment using appropriate tools, such as milling or cutting tools. The CLCP pigment is eventually classified through triage and sieving operations.

The pigment flake manufactured according to the present invention has a thickness in the range of 0.1 to 50 micrometers and a diameter in the range of 10 to 1000 micrometers. Narrower sub-ranges are chosen within these ranges according to the specific requirement of each application. Most preferred is a pigment having a flake thickness in the range between 0.5 and 6 micrometers and a flake diameter in the range of 1 to 200 micrometers.

A pigment particle obtained according to the present invention behaves mechanically as a single solid body, but optically exhibits the combined properties of the individual layers of which it is composed. It is thus possible, using the process of the present invention, to produce CLCP pigment having reflection and/or other optical properties, which cannot be produced according to the prior art.

Noteworthy, an unusual colour shift, e.g. a colour changing from green to red-violet, can be produced, whereas a conventional CLCP at most can exhibit a colour travel from green to blue.

Similarly, CLCP multilayers can be produced wherein the individual layers, having different reflection wavelengths, reflect light of a different sense of circular polarization. The resulting film, as well as the pigments produced from it, display a first colour to the unaided eye, and different second and third colours when viewed through left- or right-circular polarizing filters, respectively.

The product made according to the present invention is recognizable under the scanning electron microscope at its abrupt change of the cholesteric liquid crystal pitch across the optical layer interface (see, for example, the embodiment according FIG. 3 discussed below); the said pitch is noteworthy responsible for the optical interference properties (reflection wavelength) of the cholesteric material. With reference to FIG. 3, there is a first pitch of about 200 nanometers pitch height in the left part of the layer, and a second pitch of about 130 nanometers pitch height in the right part of the layer.

The so obtained CLCP pigments are used in printing inks, as well as in lacquers and for the mass-colouring of plastic materials. In particular, the pigments according to the present invention can be formulated into a printing ink for the printing of optical security markings, e.g. on banknotes, value documents, identity documents, tax banderoles, lottery and transportation tickets, product security labels, and the like. The said optical security markings have the advantage to show, aside the visible colour shifting effect with changing viewing angle, as well an invisible circular polarization effect, which can be evidences with the help of a corresponding instrument.

In a particular embodiment of a security element, a first layer of the CLCP multilayer reflects a first colour, e.g. green, of left-circular polarized light, and a second layer of the CLCP multilayer reflects a second colour, e.g. red, of right-circular polarized light. There will be a first visible colour displayed by the security element to the unaided eye, which is composed of both reflections, e.g. green and red; the resulting appearance is yellow. Viewed under a left-circular polarizing filter, however, the same security element will appear green, and viewed under a right-circular polarizing filter, it will correspondingly appear red.

The pigments of the present invention are preferably used in printing inks for the silk-screen, flexo, and gravure printing processes; however, offset, copperplate intaglio and tampographic printing processes are considered as well.

Further to use in printing inks, the pigments of the present invention can also find application in lacquers for industrial and automotive coatings, as well as for cosmetic articles and for the mass-colouring of plastics and master batches for the plastic industry.

The multilayers of cholesteric liquid crystal polymer (CLCP) according to the present invention can be used for applications in the field of security documents, in the graphic industry, in coating compositions, or in cosmetic products.

The flake pigments according to the present invention can be used for applications in the field of security documents, in the graphic industry, in coating compositions, for in-mold applications, or in cosmetic products.

The present invention claims as well any object comprising the herein disclosed flake pigments. The flake pigments can noteworthy be used in printing inks and coating compositions, which may in particular be used for the protection of security documents, such as currency, value documents, identity documents, tax banderoles, access cards, transportation tickets or product security labels.

The multilayer cholesteric liquid crystal polymer (CLCP) of the present invention, and the pigments produced thereof, can further be used in a large variety of technical applications, according to the following, non-exhaustive list: Automotive paints, OEM and refinish; Dip coatings (e.g. for candles); Coloration of plastics by batching or compounding; In-mold applications (printing on PC films, which are put on the surface of 3-dimenional plastic parts); Cosmetic applications such as nail lacquers, eye shadows, lotions, mascara, make-up, creams, powders, gels, hair gels, etc.; Powder coatings; Industrial coatings—water- and solvent borne; Coatings for plastics and metals; Gel coats (e.g. for boats and yachts); Printing inks (Screen inks, flexo, gravure, intaglio etc.); Packaging; Security applications such as security threads, markings, product security labels, seals, hot stamped features etc.; Security features on Banknotes, vouchers, ID documents, certificates, (transportation) tickets; Paints and coatings for consumer electronics; Paints and coatings for sports equipments; Paints and coatings for furniture; Glass paints; Architectural paints; Fishing lures; Features for product identification; Aerosol paints (do it yourself); Traffic signs; Advertisements; Machine readable security features (colour+polarisation); Recreation equipment; Vinyls, artificial leather (seats); Decals; Aircraft coatings.

The invention is now further illustrated with the help of non-limiting exemplary embodiments and figures.

Figure 3:
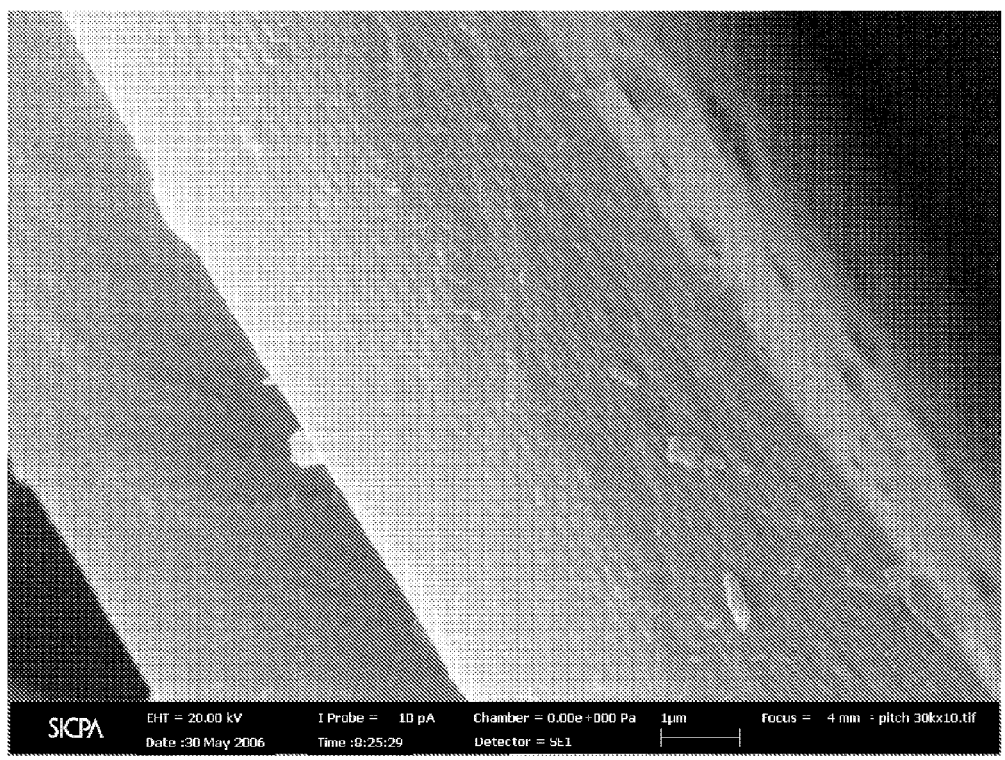

FIG. 3 shows a scanning electron micrograph of the edge of a 2-layer pigment particle of the present invention, illustrating the facts that a) no phase border (which would show up as a fracture irregularity) is visible between the two layers, and b) that two layers with differing optical properties are present. The helical pitch of the cholesteric structure is visible as fine strides across the thickness of the flake. There is a clearly visible abrupt change of stride density (corresponding to a change of the helical pitch; about 200 nanometers in the left part versus about 130 nanometers in the right part of the image) in the middle of the flake.

Figure 4:
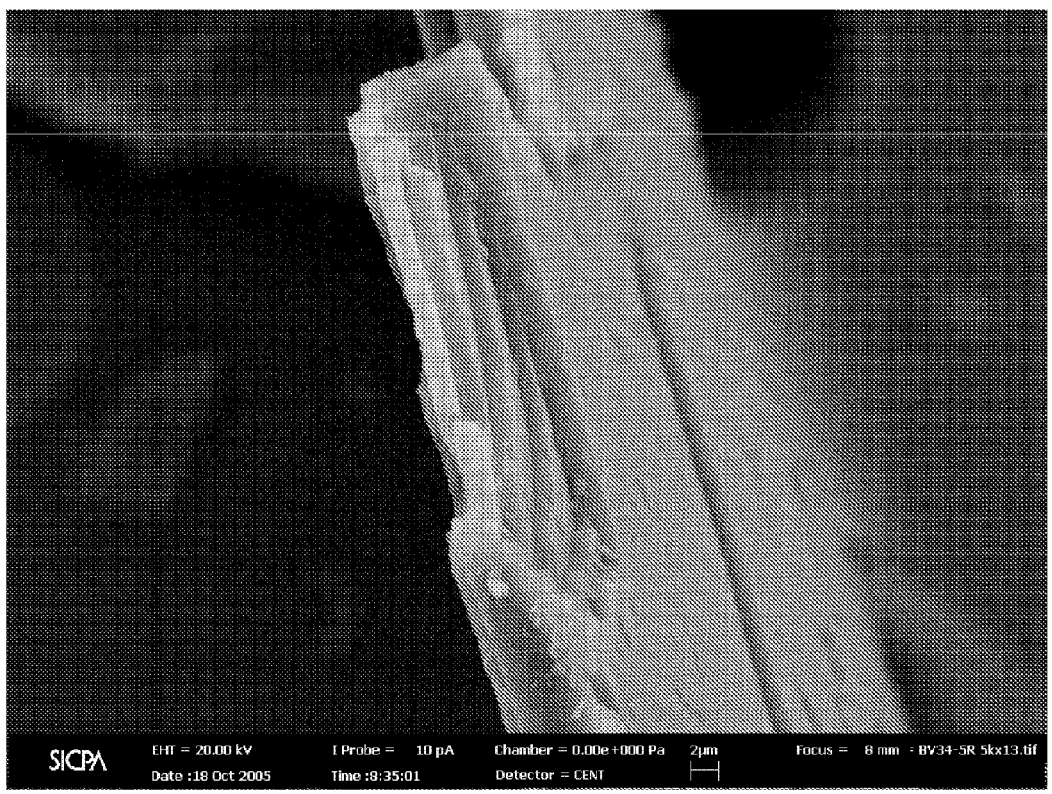

FIG. 4 shows a scanning electron micrograph of a multi-layer pigment flake prepared according to the process of the prior art (Dobrusskin et al., WO 95/08786); this material exhibits clearly defined mechanical phase borders between the different sub-layers and tends to decompose into its individual laminas at the fracture zone.

Figure 5:
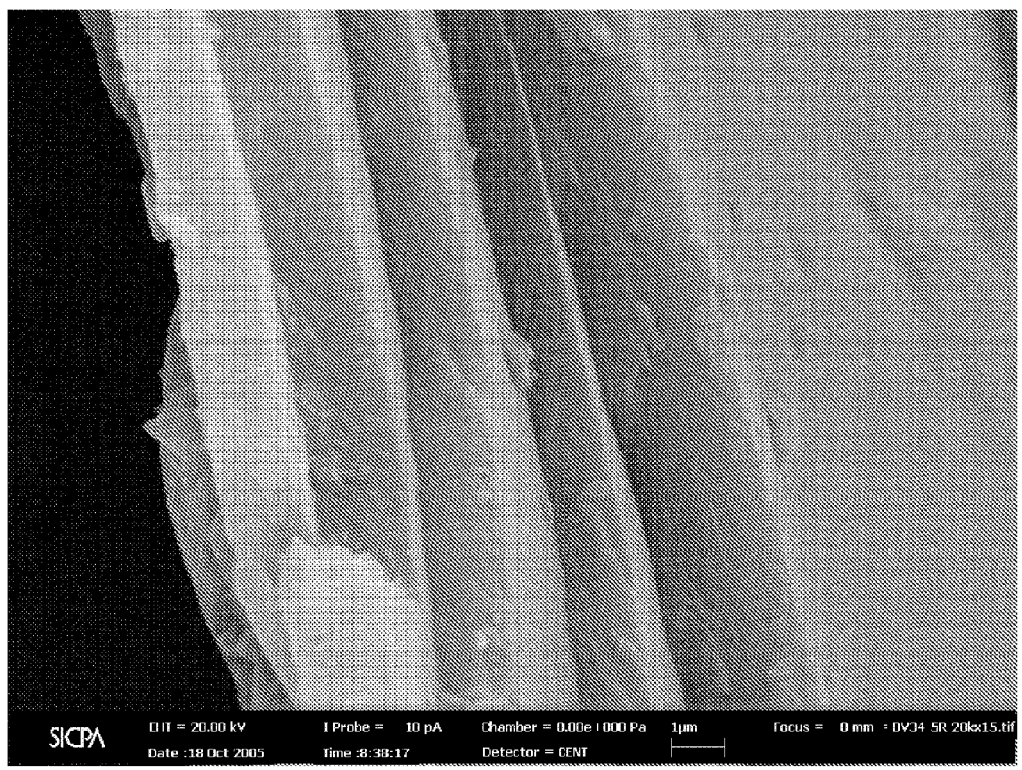

FIG. 5 shows a scanning electron micrograph of a closer view to the fracture zone of the prior art pigment flake of FIG. 4: a clean rupture at the individual sub-layer borders is observed, illustrating the easy decay of the flake into its individual laminas under mechanical stress (pigment preparation, incorporation into ink, printing).

Figure 6A:
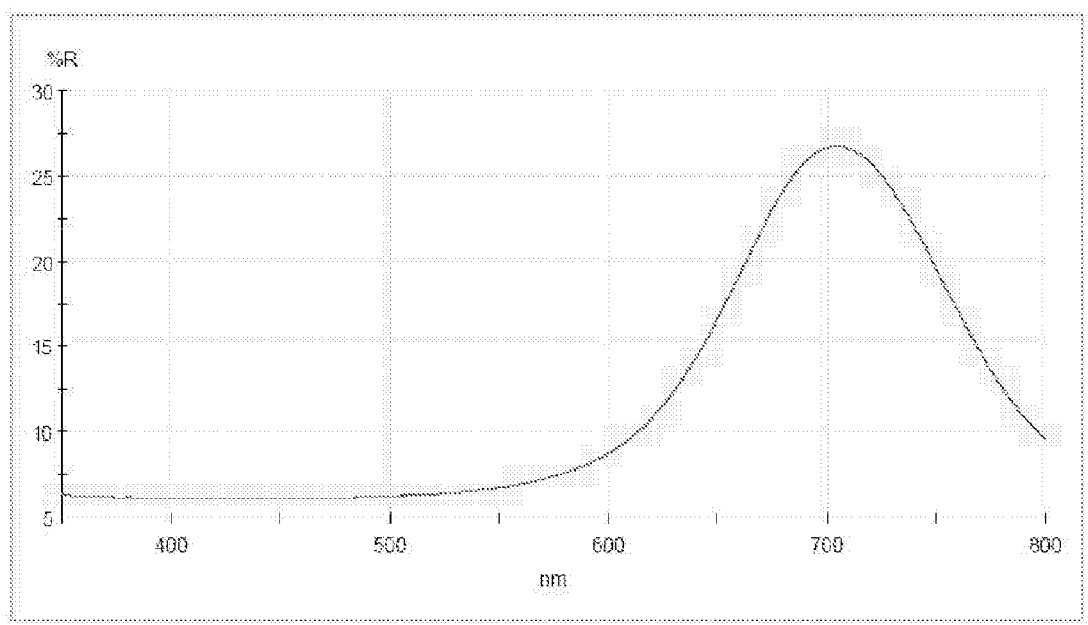
Figure 6B:
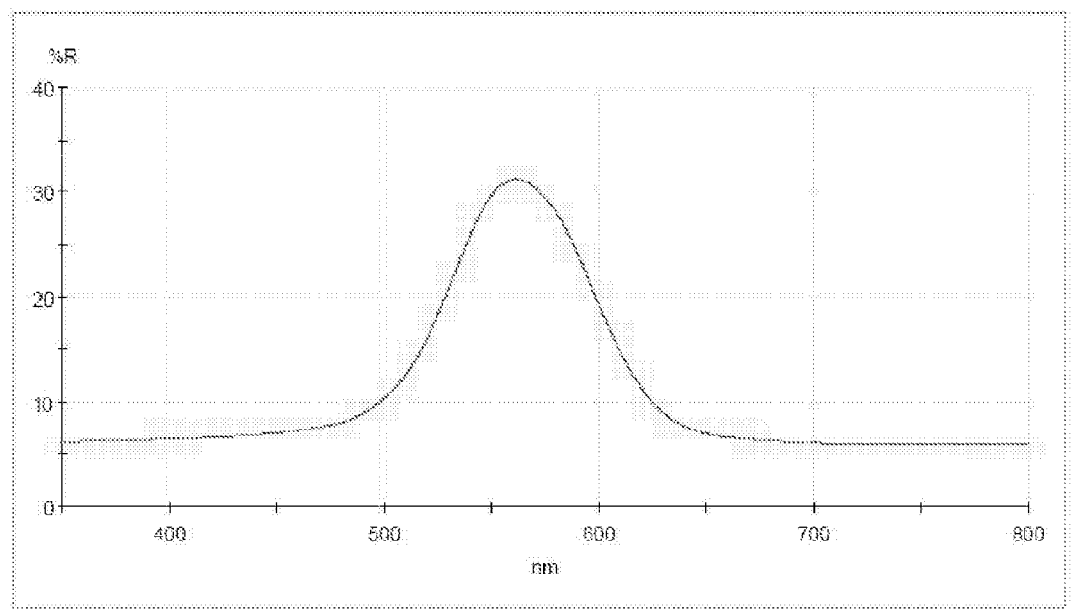
Figure 6C:
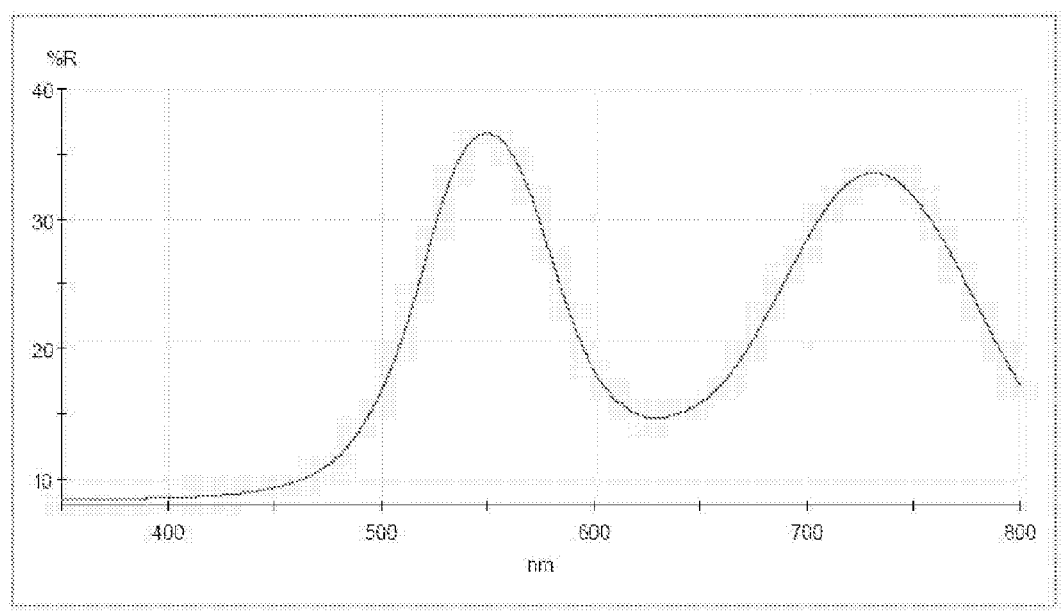

FIG. 6 shows reflection spectra for a two-layer CLCP according to the present invention, similar to example no. 11 of table 1: (a) first layer after application and partial UV-curing; reflection maximum at about 700 nm wavelength; (b) second layer after application and partial UV-curing; reflection maximum at about 560 nm wavelength; (c) second layer on top of first layer, after thorough UV-curing; reflection maxima at about 550 nm and 725 nm wavelength.

Figure 7:
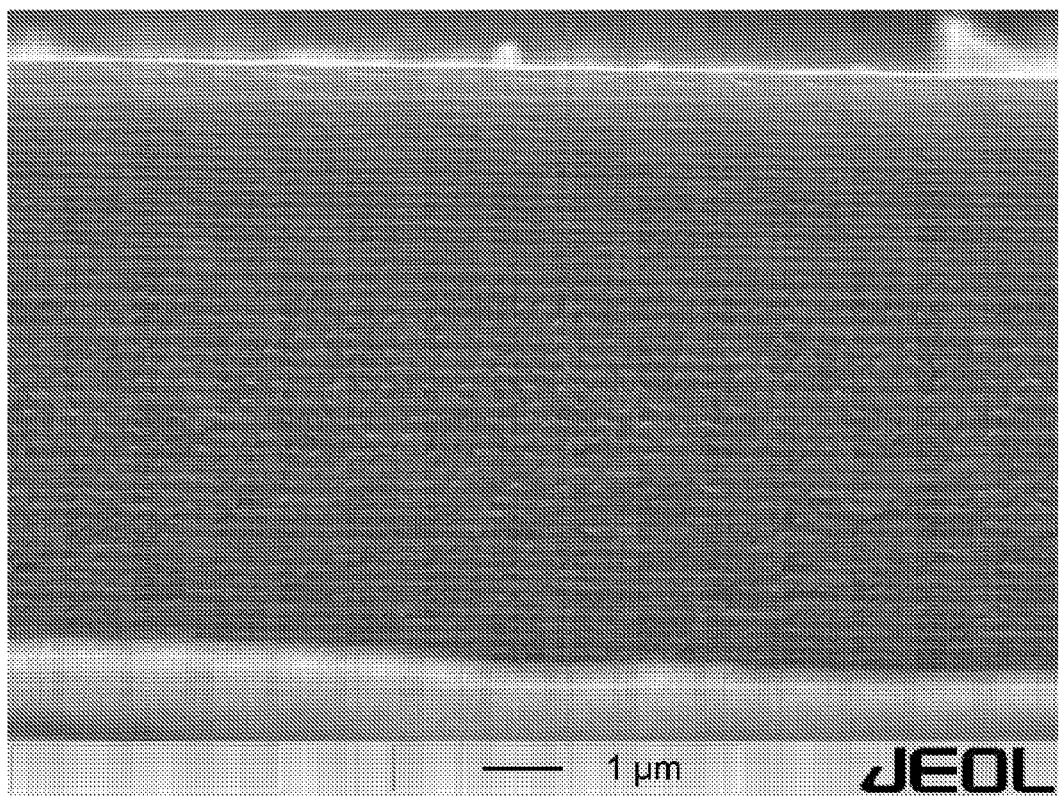

FIG. 7 shows a scanning electron micrograph of the edge of a 3-layer pigment particle made according to the process of the prior art (US 2005/0266158 A1), illustrating the gradual pitch variation across the particle.

Figure 8:
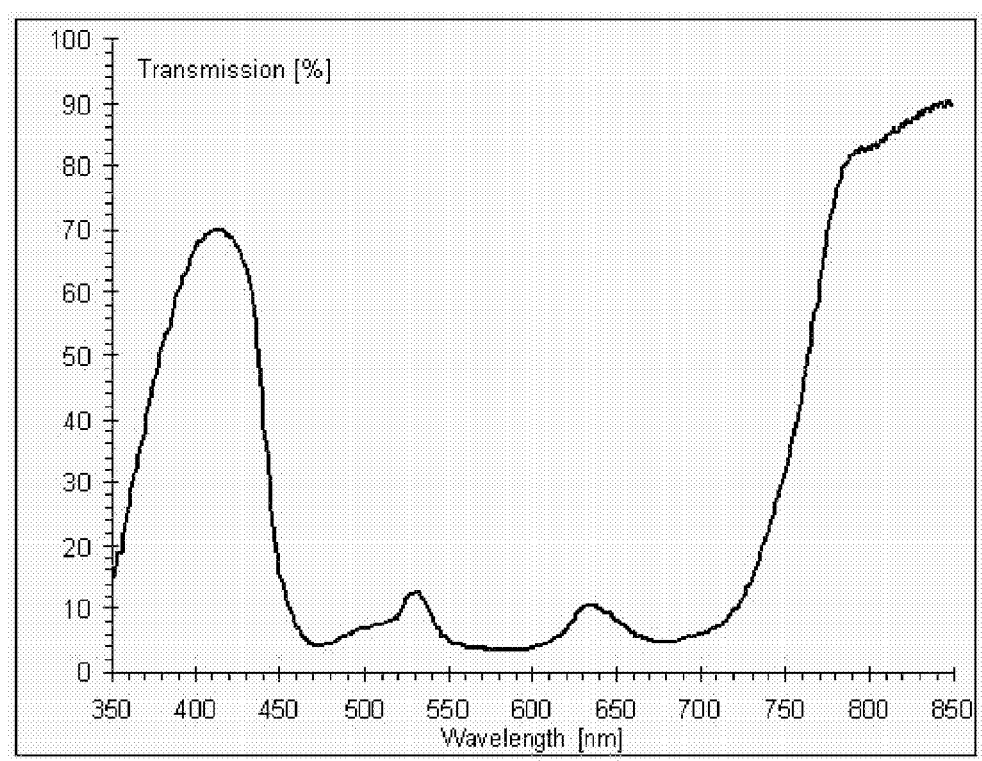

FIG. 8 shows the transmission spectrum of a 3-layer pigment particle made according to the process of the prior art (US'2005/0266158 A1), illustrating the presence of three distinct optical layers (the corresponding reflection spectrum can be inferred by an inversion of the curve).

FIG. 9 shows the evolution of the pitch height across the edge of a pigment particle: a) of a pigment made according to the process of the prior art (US 2005/0266158 A1); and b) of a pigment made according to the present invention.

EXAMPLES

Starting Materials Used in Examples 1 to 15

In the synthesis of the pigments of examples 1 to 15, the following starting materials were used. In table 1 at the end of the example section, it is indicated by the bold numbers which component was used in which example.
Nematic principal component (Component A in the above formula): hydroquinone-bis-[4-(4-acryloylbutoxy)-benzoate], (1), (obtained according to Broer, D. J., Mol, G. N., Challa, G.; Makromol. Chem. 1991, 192, 59)
Chiral components (Component B in the above formula):
AnABIs, 2-[4-(acryloyloxy)-benzoyl]-5-(4-methoxybenzoyl)-isosorbid, (2), (obtained according to EP 1 046 692, example 3),
DiABIs, di-2,5-[4-(acryloloxy)-benzoyl]-isosorbid, (3), (obtained according to EP 1 046 692, example 4),
DiABIm, di-2,5-[(4'-acryloyloxy)-benzoyl]-isomannid, (4), (obtained according to EP 1 149 823, example 13), or methacrylic acid cholesterol ester (5), (obtained according to De Visser et al., J. Polym. Sci., A 1(9), 1893 (1971)).
iii) Polymerization stabilizer 2,6-di-t-butyl-4-(dimethylamino-methyl)-phenol (6) (Ethanox® 703, Ethyl Corp., Baton Rouge, La. 70801)
iv) photoinitiator (7) Irgacure® 819 (Ciba Specialty Chemicals GmbH, Lampertsheim)
General Synthesis of the Pigments of Examples 1 to 15

The nematic principal component 1 and the respective chiral compound 2, 3, 4, or 5, and about 300 ppm of the stabilizer 6, were mixed together, according to the weight ratios given in the examples (with respect to 100 parts of the principal component), in a heatable container and melted until a clear liquid resulted. The melt was homogenized with a stirrer and at last, the photoinitiator 7 was added under stirring. The separate stirring in of the photoinitiator 7 as the last ingredient, according to the weight ratios given in the examples, served to prevent a premature, thermally induced crosslinking of the mixture. The thus obtained compositions were used as material for the cholesteric layers to be generated on a substrate.

The amounts of compounds used in the respective examples are given in table 1.

The LC-mixtures, prepared as indicated above, were coated, according to the outlined processes, with the help of a roller coater onto a pre-tempered flexible polyethylene-terephthalate (PET) carrier substrate in a layer thickness as indicated in table 1 below. The coating and curing conditions for each example are also indicated in table 1 below.

Generally, in a two-stage coating process, as outlined above, on a substrate, a first cholesteric layer was directly applied onto the PET substrate, and following to this, a second cholesteric layer was applied onto the first layer. After a determined diffusion time, i.e. dwell time of the two-layer packet in a tempering unit, the whole coating was UV-polymerized.

The layer thickness of all applied layers was each controlled on the basis of the used quantity-of LC-mixture per coated area. After the coating was finished, the layer thickness was cross-checked with the help of the layer thickness measurement instrument Supramess (Mahr GmbH, D-37073 Gottingen). The wavelengths of maximum reflection were obtained from the trans-mission spectra of the individual layers, with the help of a UV/VIS spectrometer (Model Lambda 19 of Perkin Elmer, Ueberlingen, Germany). The obtained values are summarized in table 1 below.

To suppress the influence of air oxygen during the oxygen-sensitive UV-polymerization reaction, a PET cover foil, analogue to the PET substrate foil, was used. The cover foil was applied on top of the CLCP-coating, immediately after the application of the last CLCP-layer, and before the UV-polymerization stage.

After application of each layer, the CLCP-coated and PET-foil-covered substrate passed a tempering/orienting tunnel, where it was exposed to a temperature in the range of between 90° C. and 125° C., usually about 110° C. Due to the constant length of this tunnel, the time for orientation of the liquid crystal coating is determined by the passing speed. At the end of the tunnel, the oriented liquid crystalline layer was polymerized by a mercury UV lamp (doses in the range of 0.07 to 0.5 J/cm$^2$ of UV/A).

The first layer was not completely cross-linked, by using a reduced dose of UV radiation and a lower concentration of photoinitiator. The cover foil was removed, and the solidified first coating on the PET foil substrate was coated with a second layer of LC-mixture, having a reflection wavelength differing at least by 20 nm from that of the first layer.

After the second coating operation and the corresponding application of a cover foil, the whole coating (i.e. the resulting multilayer) was subjected to a second UV-polymerization, using a UV dose in the range of 0.07 to 0.5 J/cm$^2$ of UV/A.

Figure 1:
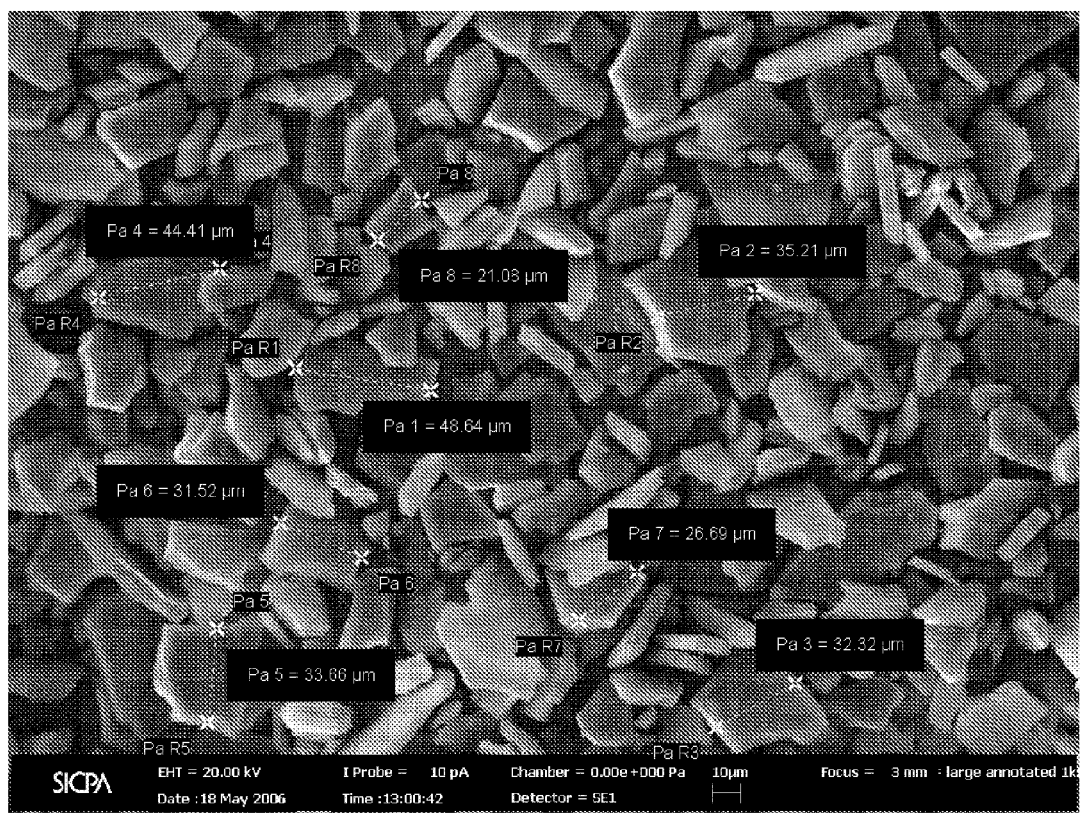
FIG. 1 shows a scanning electron micrograph of a 2-layer pigment of the present invention; including annotations as to the typical physical dimensions of the pigment particles.
Figure 2:
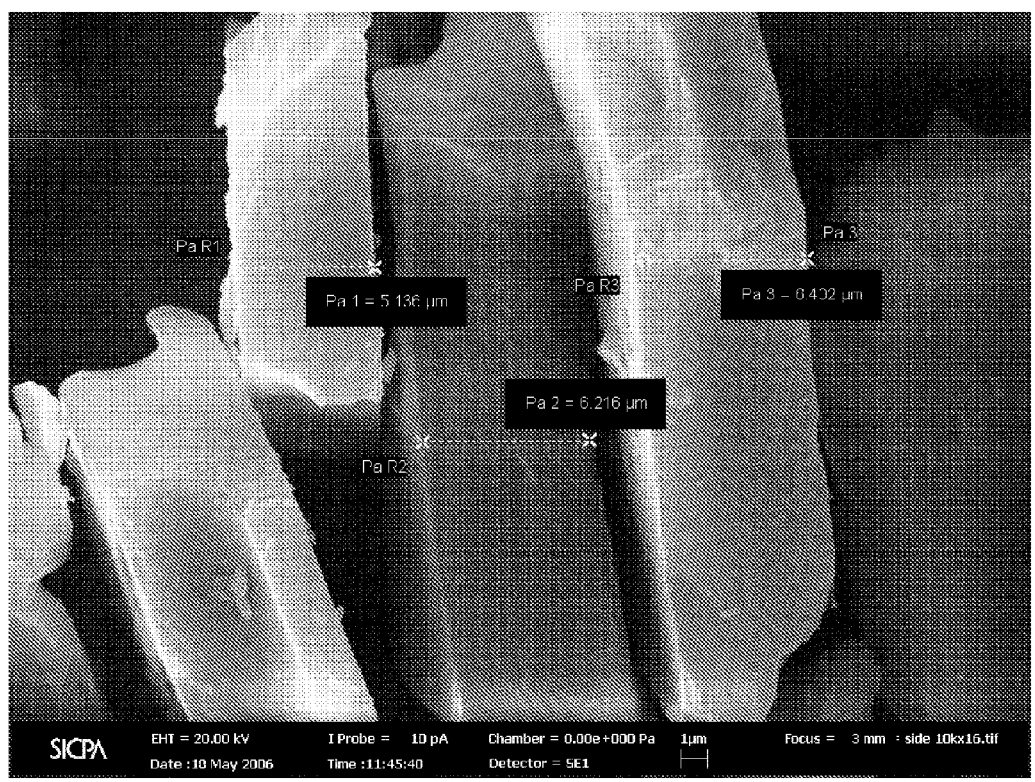
FIG. 2 shows a scanning electron micrograph of some typical fracture zones of a two-layer pigment of the present invention, with annotated thickness values. No delamination is visible at the layer borders.

Following to this, the resulting 'sandwich' of substrate, CLCP-double-layer and cover foil was separated, and the CLCP-double-layer was stripped from the PET foil (substrate and/or cover foil) with the help of a knife. The stripped CLCP-material, present in the form of coarse flakes, was worked up to pigment by milling on an air-jet mill (of the company Hokosawa-Alpine, Augsburg, Germany), followed by triage/sieving, to yield an CLCP-pigment having a particle size d50 between 18 and 35 micrometers. The particle size was determined with the particle size analyzer HELOS (dispersion measurement in water) of the company Sympatec GmbH, Clausthal-Zellerfeld. FIGS. 1, 2 and 3 show electron micrographs of such resulting pigment.

The scanning electron micrograph of the broken edge of a 2-layer CLCP film according to the present invention (FIG. 2), illustrates the facts that a) no mechanical phase border (which would show up as a fracture kink) is visible between the two layers, and b) that two layers with differing optical properties are present. The helical pitch of the cholesteric structure is noteworthy visible in the electron micrograph as fine strides across the thickness of the film. There is a clearly visible abrupt change of stride density (corresponding to a change of the helical pitch) in the middle of the film (FIG. 3: about 200 nanometers in the left part versus about 130 nanometers in the right part of the image). The present materials are characterized by an abrupt change of the said helical pitch at the interface of optical layers of different properties; the pitch changing from a first to a second value within a single pitch height, so that no zone of intermediate pitch is observed.

The electron-microscopically visible strides, corresponding to the cholesteric texture, are not a mechanical layer structure, in the sense that there would be layers along which the flake could be cleaved; indeed, no such cleaving has ever been observed in the present materials. The observed strides are due to a differential electronic charging effect of the ordered cholesteric material, which can be produced using determined experimental conditions in taking the SEM picture.

For comparison, the multilayer pigment prepared according to the process of the prior art (WO 95/08786) exhibits clearly defined mechanical phase borders between the different sub-layers and tends to decompose into its individual laminas at these preconfigured fracture zones, as shown by FIGS. 4 and 5.

FIG. 6 shows reflection spectra of two individual CLCP layers differing in their reflection maxima (a, b), and a reflection spectrum of a corresponding double-layer CLCP (c) according to the present invention, exhibiting both reflection maxima of (a) and (b).

To evidence the difference between the product made according to the process of the present invention and the product made according to the process of the prior art (US 2005/0266158 A1, Pokorny et al.), for comparison a cholesteric multilayer was produced according to Pokorny et al., through the application of a thick, single liquid layer comprising CLC-polymers, CLC-monomers and solvent. The so applied layer was sequentially subjected to i) a first, partial evaporation-drying, ii) a first, partial UV-curing, iii) a second, thorough evaporation drying, and iv) a second, thorough UV-curing.

FIG. 7 shows an electron micrograph of a cross-section of the resulting, eight micrometer thick CLCP layer. There is no abrupt change of the cholesteric liquid crystal pitch, but a gradual increase of the pitch, from the bottom to the top, followed by a steeper, but also gradual decrease of the pitch. The cholesteric pitch evolves smoothly across the layer; there are no pronounced steps.

FIG. 8 shows the resulting transmission spectrum, which is similar to the spectra reported by Pokorny et al. (FIG. 16, 17 of US 2005/0266158 A1), and which indicates the presence of three distinct optical layers.

To illustrate the observed difference, the individual pitch heights across the multilayer were measured in the SEM images for the prior art (FIG. 7) and for the present invention (FIG. 3).

Figure 9A:
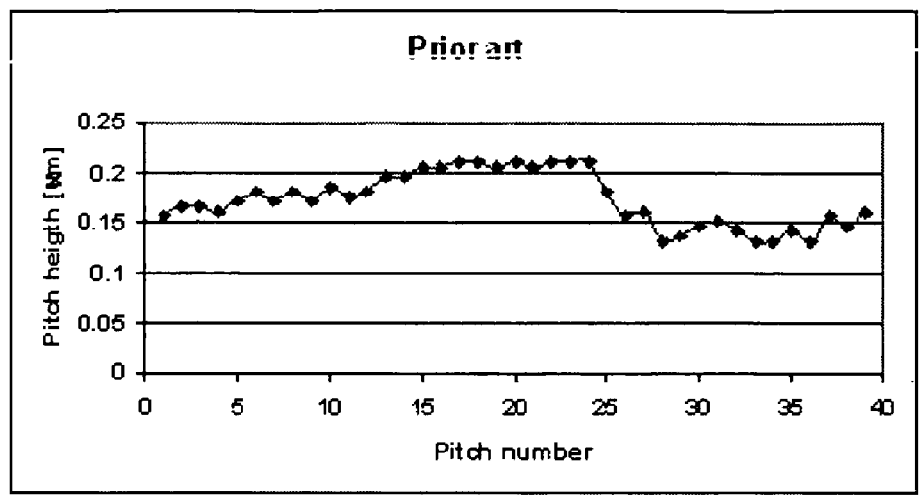
Figure 9B:
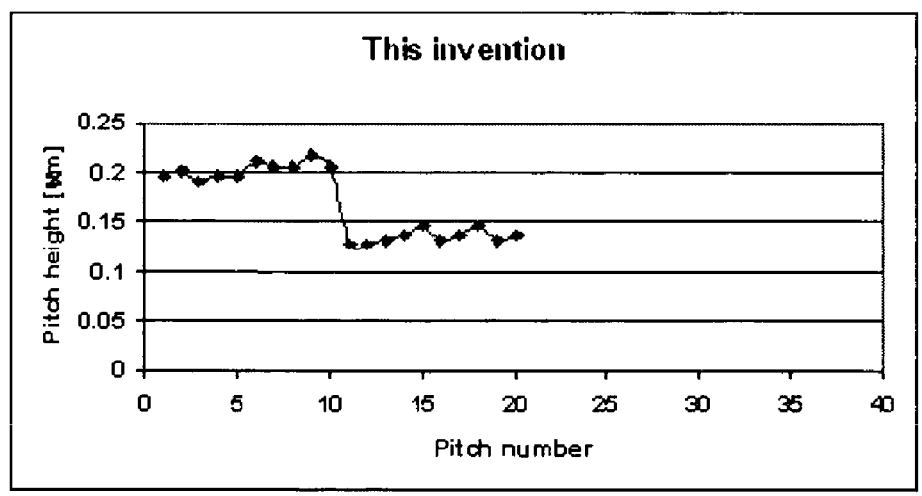

FIG. 9a shows the gradual increase and decrease of the pitch height across the multilayer made according to Pokorny et al., FIG. 9b shows the abrupt decrease of the pitch height across the multilayer made according to the present invention. The change from the said first to the said second pitch substantially occurs within a single pitch height, so that no zone of intermediate pitch height is observed.

From a thermodynamic point of view it is evident that a partial evaporation process, such as is used in the process of Pokorny et al., must produce a gradual variation of the pitch height, because the conditions are not homogeneous across the cholesteric layer, if evaporation at the surface is involved. In the process according to the present invention, no evaporation of volatile components is involved, and layers of predetermined properties are applied on top of each other, which yields an abrupt change of properties at the layer boundaries.

TABLE 1

| | Resulting CLCP-Pigments | | Composition of coatings 1 and 2 | | | | | | |
|---|---|---|---|---|---|---|---|---|---|
| Example no. | Visual colour impression of the CLCP-pigments at observation @ 90/45° | Reflection maxima [nm] | | Reflection maximum | Layer thickness [µm] | UV-Dose [%] | Coating speed [m/min] | Photo-initiator [wt %] | Amount of chiral compound [wt %] | Chiral compound |
| 1 | green/ | 520/ | Coating 1 | 532 | 2-3 | 60 | 40 | 1.95 | 8.2 | 2 |
|   | silvergray | 680 | Coating 2 | 709 | 2-3 | 100 | 25 | 0.05 | 25.7 | 5 |
| 2 | goldgreen/ | 500/ | Coating 1 | 664 | 2-3 | 60 | 40 | 0.05 | 6.7 | 2 |
|   | magenta | 640 | Coating 2 | 504 | 2-3 | 100 | 30 | 1.95 | 8.2 | 2 |
| 3 | Gold | | Coating 1 | 655 | 2-3 | 60 | 40 | 0.05 | 6.44 | 2 |
|   | pink | | Coating 2 | 511 | 2-3 | 100 | 30 | 1.95 | 7.9 | 2 |
| 4 | gold/ | 520/ | Coating 1 | 521 | 2-3 | 60 | 40 | 0.05 | 7.9 | 2 |
|   | turquoise | 620 | Coating 2 | 635 | 2-3 | 100 | 30 | 1.95 | 6.44 | 2 |
| 5 | green/ | 500/ | Coating 1 | 693 | 2-3 | 60 | 40 | 0.05 | 6 | 2 |
|   | magenta | 680 | Coating 2 | 507 | 2-3 | 100 | 25 | 1.95 | 7.9 | 2 |
| 6 | Graygreen/ | 500/ | Coating 1 | 680 | 4 | 60 | 40 | 0.05 | 6 | 2 |
|   | pink | 680 | Coating 2 | 502 | 2 | 100 | 25 | 1.95 | 7.9 | 2 |
| 7 | green/ | 510/ | Coating 1 | 696 | 3 | 60 | 40 | 0.05 | 6 | 2 |
|   | violet | 690 | Coating 2 | 517 | 3 | 100 | 25 | 0.2 | 7.9 | 2 |
| 8 | green/ | 520/ | Coating 1 | 730 | 2-3 | 60 | 40 | 0.05 | 5.7 | 2 |
|   | violet | 700 | Coating 2 | 519 | 2-3 | 100 | 30 | 0.2 | 7.6 | 2 |
| 9 | green/ | 540/ | Coating 1 | 769 | 3 | 60 | 40 | 0.05 | 5.4 | 2 |
|   | violet | 700 | Coating 2 | 550 | 3 | 100 | 30 | 0.2 | 7.3 | 2 |
| 10 | blue/ | 480/ | Coating 1 | 762 | 3 | 60 | 40 | 0.00 | 5.7 | 2 |
|   | magenta | 700 | Coating 2 | 478 | 3 | 100 | 30 | 0.2 | 7.6 | 2 |
| 11 | Goldgreen/ | 540/ | Coating 1 | 741 | 3 | 60 | 40 | 0.05 | 5.7 | 2 |
|   | silver | 700 | Coating 2 | 549 | 3 | 100 | 30 | 0.2 | 7.6 | 2 |

TABLE 1-continued

| | Resulting CLCP-Pigments | | | | Composition of coatings 1 and 2 | | | | | |
|---|---|---|---|---|---|---|---|---|---|---|
| Example no. | Visual colour impression of the CLCP-pigments at observation @ 90/45° | Reflection maxima [nm] | | Reflection maximum | Layer thickness [μm] | UV-Dose [%] | Coating speed [m/min] | Photo-initiator [wt %] | Amount of chiral compound [wt %] | Chiral compound |
| 12 | green/ | 520/ | Coating 1 | 734 | 3 | 100 | 40 | 0.00 | 5.7 | 2 |
|  | pink | >700 | Coating 2 | 530 | 3 | 100 | 30 | 0.2 | 7.6 | 2 |
| 13 | gold/ | 540/ | Coating 1 | 546 | 3 | 100 | 40 | 0.00 | 7.6 | 2 |
|  | blue | 660 | Coating 2 | 669 | 3 | 100 | 30 | 0.2 | 5.7 | 2 |
| 14 | Blue/ | 420/ | Coating 1 | 741 | 3 | 100 | 40 | 0.25 | 5.3 | 2 |
|  | red | >700 | Coating 2 | 430 | 3 | 100 | 30 | 1.75 | 9 | 2 |
| 15 | blue/ | 420/ | Coating 1 | 431 | 3 | 30 | 40 | 0.25 | 9.1 | 3 |
|  | red | >700 | Coating 2 | 712 | 3 | 30 | 50 | 1.7 | 12.25 | 4 |

The numerals of the chiral compounds refer to the numerals indicated in the text.

The required doses of UV/A radiation were in the order of 0.3 J/cm$^2$ for the given examples, corresponding to the indicated 100% value of UV power. Lower percentage values in the table refer to a correspondingly lower UV/A dose.

Production of a Lacquer Containing Pigments According to the Invention

The CLCP-pigments obtained according to the outlined above were stirred, at a weight ratio of 3%, into a transparent coating composition (e.g. Tinted Clear Additive Deltron 941, PPG Industries, UK-.Suffolk, IP14 2AD).

Effect Coating on a Paper Support Using Pigments of the Present Invention

The coating composition according to the previous example was applied onto a black, brilliant paper support with the help of a film coater (of the company Erichsen, D-58675 Hemer), whereby a gap height of 180 micrometers and a coating speed of 10 mm per second were used. After a drying time of 10 min at room temperature, the coated substrates were dried for 1 hour at 80° C. The reflection spectra of the dried lacquers were determined with a colorimeter CM508/d of the company Minolta (D-22923 Ahrensburg), and the corresponding wavelengths of maximum reflection are mentioned in the table.

Polarizing Effect of the Embodiment of Example 15

The effect coating obtained as described above using the pigments of example 15 was visually observed under left- and right-handed circular polarizing filters (obtainable, e.g. form Schneider-Kreuznach, Bad Kreuznach, Germany). Under the left-circular polarizing filter, a red colour was observed at orthogonal view, whereas under the right-circular polarizing filter, a blue colour was observed at orthogonal view. In the absence of a circular polarizing filter, a blue-violet colour was observed at orthogonal view, which progressively turned to red with increasing obliqueness of the viewing angle.

The invention claimed is:

1. Process for making a multilayer of cholesteric liquid crystal polymer (CLCP), comprising at least two layers of CLCP, differing in at least one optical property, arranged on top of each other, said process comprising:
   a) depositing at least one coating layer of CLCP monomer precursor material, comprising cross-linkable groups, onto a flexible carrier substrate;
   b) orienting the at least one CLCP coating layer;
   c) partially curing the oriented layer of a), so as to leave an amount of cross-linkable groups in the layer for chemical inter-layer cross-linking with an adjacent coating layer through the polymer network;
   d) depositing a last coating layer of CLCP monomer precursor material, comprising cross-linkable groups, on top of a previous partially cured coating of the at least one CLCP coating layer;
   e) orienting the last CLCP coating layer;
   f) thoroughly curing the whole assembly, so as to essentially cross-link all of the cross-linkable groups throughout each coating layer and to form a mechanically unique solid body which is capable of being comminuted to pigment without delamination and which has an abrupt change of cholesteric liquid crystal pitch at an interface between layers of cholesteric liquid crystal polymer so that a change of cholesteric liquid crystal pitch from one layer to another is less than one pitch height without an intermediate pitch.

2. Process according to claim 1, further comprising repeating a) to c) a chosen number of times, to deposit, orient and partially cure additional layers of CLCP monomer precursor material comprising cross-linkable groups on top of a previous coating, before step d) is carried out.

3. Process for making a multilayer of cholesteric liquid crystal polymer (CLCP), comprising at least two layers of CLCP, differing in at least one optical property, arranged on top of each other, said process comprising:
   a) depositing at least one coating layer of CLCP monomer precursor material, comprising cross-linkable groups, onto a flexible carrier substrate;
   b) freezing or evaporation-drying the at least one CLCP coating;
   c) depositing a last coating layer of CLCP monomer precursor material, comprising cross-linkable groups, on top of a previous coating;
   d) freezing or drying the CLCP the last coating layer;
   e) orienting the deposited CLCP coating layers; and
   f) thoroughly curing the whole assembly, so as to essentially cross-link all of the cross-linkable groups throughout each coating layer and to form a mechanically unique solid body which is capable of being comminuted to pigment without delamination and which has an abrupt change of cholesteric liquid crystal pitch at an interface between layers of cholesteric liquid crystal polymer so that a change of cholesteric liquid crystal pitch from one layer to another is less than one pitch height without an intermediate pitch.

4. Process according to claim 3, further comprising repeating a) and b) a chosen number of times, to deposit additional layers of CLCP monomer precursor material comprising cross-linkable groups on top of the previous coating, before step c) is carried out.

5. Process according to claim 1, wherein said coating layers are applied from the molten state.

6. Process according to claim 1, wherein said coating layers are applied from solutions.

7. Process according to claim 1, wherein said curing is performed by UV-radiation.

8. Process according to claim 7, wherein the dose of UV-radiation is chosen lower for the at least one coating layer and higher for the last coating layer.

9. Process according to claim 1, wherein an amount of photoinitiator comprised in said CPLC precursor material is chosen lower in the first at least one coating layer and higher in the last coating layer.

10. Process according to claim 1, wherein the curing is performed by electron beam radiation.

11. Multilayer of cholesteric liquid crystal polymer (CLCP), comprising at least two layers of CLCP differing in at least one optical property arranged on top of each other, wherein said at least two layers are chemically inter-layer cross-linked through a polymer network and form a mechanically unique solid body which is capable of being comminuted to pigment without delamination, and which has an abrupt change of cholesteric liquid crystal pitch at an interface between said at least two layers of cholesteric liquid crystal polymer so that a change of cholesteric liquid crystal pitch from one layer to another is less than one pitch height without an intermediate pitch.

12. Multilayer of cholesteric liquid crystal polymer (CLCP) according to claim 11, wherein said multilayer is obtained by:
a) depositing at least one coating layer of CLCP monomer precursor material, comprising cross-linkable groups, onto a flexible carrier substrate;
b) orienting the at least one CLCP coating layer;
c) partially curing the oriented layer of a), so as to leave an amount of cross-linkable groups in the layer for chemical inter-layer cross-linking with an adjacent CLCP coating layer through the polymer network;
d) depositing a last coating layer of CLCP monomer precursor material, comprising cross-linkable groups, on top of a previous partially cured coating of the at least one CLCP coating layer;
e) orienting the at last CLCP coating;
f) thoroughly curing the whole assembly, so as to essentially cross-link all of the cross-linkable groups throughout each coating layer and to form a mechanically unique solid body which is capable of being comminuted to pigment without delamination.

13. Multilayer of cholesteric liquid crystal polymer (CLCP) according to claim 11, wherein said CLCP comprises components A) and B), wherein
A) is 20-99.5 wt % of at least one or several three-dimensionally crosslinkable compounds of the mean general formula (1)

   (1)

wherein
$Y^1, Y^2$ are equal or different, and represent polymerizable groups;
$A^1, A^2$ are equal or different residues of the general formula $C_nH_{2n}$, wherein n is en integer between 0 and 20, and wherein one or several methylene groups may be replaced by an oxygen atom;
$M^1$ has the general formula $-R^1-X^1-R^2-X^2-R^3-X^3-R^4-$;
wherein
$R^1$ to $R^4$ are equal or different bivalent residues chosen from the group consisting of —O—, —COO—, —COHN—, —CO—, —S—, —C=C—, CH—CH—, —N=N—, —N=N(O)—, and a C—C bond; and wherein $R^2-X^2-R^3$ or $R^2-X^2$ or $R^2-X^2-R^3-X^3$ may as well be a C—C bond;
$X^1$ to $X^3$ are equal or different residues chosen from the group consisting of 1,4-phenylene; 1,4-cyclohexylene; heteroarylenes having 6 to 10 atoms in the aryl core and 1 to 3 heteroatoms from the group consisting of O, N and S, and carrying substituents $B^1$, $B^2$ and/or $B^3$; cycloalkylenes having 3 to 10 carbon atoms and carrying substituents $B^1$, $B^2$ and/or $B^3$;
wherein
$B^1$ to $B^3$ are equal or different substituents chosen from the group consisting of hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, —OH, —F, —Cl, —Br, —I, —CN, —NO$_2$, Formyl, Acetyl, and alkyl-, alkoxy-, or alkylthio-residues with 1 to 20 carbon atoms having a chain interrupted by ether oxygen, thioether, sulfur or ester groups;
B) is 0.5 to 80 wt % of at least one chiral compound of the mean general formula (2)

   (2)

wherein
$V^1, V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —NO$_2$, Formyl, Acetyl, as well as alkyl-, alkoxy-, or alkylthio-residues with 1 to 20 carbon atoms having a chain interrupted by ether oxygen, thioether sulfur or ester groups, or a cholesterol residue;
$A^1, A^2$ are as indicated above;
$W^1, W^2$ have the general formula $-R^1-X^1-R^2-X^2-R^3-$,
wherein
$R^1$ to $R^3$ are as indicated above, and wherein $R^2$ or $R^2-X^2$ or $X^1-R^2-X^2-R^3$ may also be a C—C bond;
$X^1, X^2$ are as indicated above;
Z is a divalent chiral residue chosen from the group consisting of dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

14. Multilayer according to claim 13, wherein the component B) is selected from the group consisting of AnABIs-(2-[4-(acryloyloxy)-benzoyl]-5-(4-methoxybenzoyl)-isosorbid), DiABIs (di-2,5-[4-(acryloloxy)-benzoyl]isosorbid), or DiABIm (di-2,5[(4'-acryloyloxy)-benzoyl]-isomannid).

15. Multilayer according to claim 11, wherein the differing optical property is selected from the group consisting of a wavelength of maximum reflection, a circular polarization state of the reflected light, an optical absorption property, or a luminescence property.

16. Multilayer according to claim 11, wherein said multilayer has a narrow-band spectral feature, which is not perceived by the unaided human eye.

17. Multilayer according to claim 11, further comprising additives having non-optical properties which are selected from the group consisting of magnetic particles, radio-frequency resonant particles and forensic markers.

18. Flake pigment for printing or coating applications, obtained by comminuting a multilayer of cholesteric liquid crystal polymer (CLCP) according to claim 11.

19. Flake pigment according to claim 18, wherein the median d50 of the pigment size is comprised between 5 and 5000 micrometers.

20. Flake pigment according to claim 18, wherein the median d50 of the pigment size is comprised between 5 and 100 micrometers.

21. Flake pigment according to claim 18, wherein the median d50 of the pigment size is comprised between 10 and 50 micrometers.

22. Method of producing a flake pigment according to claim 18, comprising comminuting a multilayer of cholesteric liquid crystal polymer (CLCP) having at least two layers of CLCP differing in at least one optical property arranged on top of each other, wherein said at least two layers are chemically inter-layer cross-linked through the polymer network and form a mechanically unique solid body which is capable of being comminuted to pigment without delamination, and which has an abrupt change of cholesteric liquid crystal pitch at the interface between said at least two layers of cholesteric liquid crystal polymer so that a change of cholesteric liquid crystal pitch from one layer to another is less than one pitch height without an intermediate pitch.

23. Object or printing ink or coating composition, comprising flake pigment according to claim 18.

24. Method of producing a security document using a printing ink or coating composition according to claim 23 for the protection of security documents, selected from currency, value documents, identity documents, tax banderoles, access cards, transportation tickets or product security labels, comprising a step of applying said printing ink or coating composition according to claim 23 onto said security document.

* * * * *